(No Model.)
J. T. DONOVAN & H. L. GARDNER.
PROCESS OF PRODUCING OZONE.
No. 527,326. Patented Oct. 9, 1894.
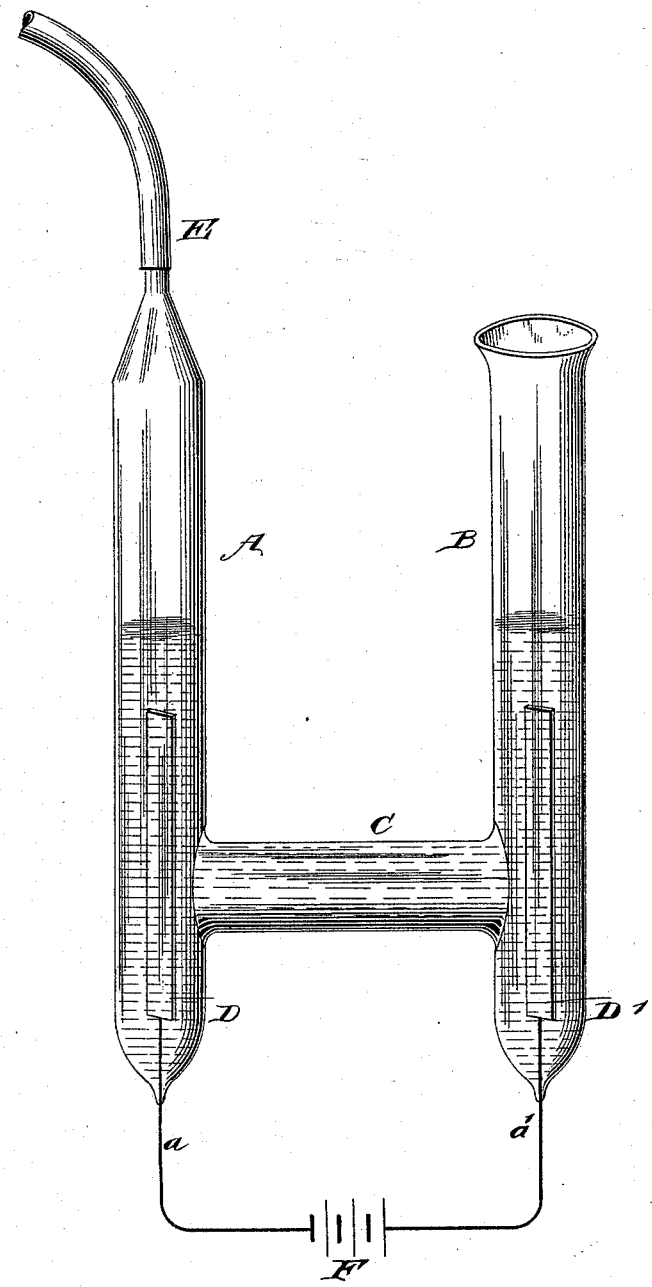
WITNESSES:
INVENTORS:

UNITED STATES PATENT OFFICE.

JOHN T. DONOVAN AND HENRY L. GARDNER, OF SPRINGFIELD, MASSACHUSETTS.

PROCESS OF PRODUCING OZONE.

SPECIFICATION forming part of Letters Patent No. 527,326, dated October 9, 1894.

Application filed February 5, 1894. Serial No. 499,072. (No specimens.)

*To all whom it may concern:*

Be it known that we, JOHN T. DONOVAN and HENRY L. GARDNER, both of Springfield, in the county of Hampden and State of Massachusetts, have invented a new and Improved Process of Producing Ozone, of which the following is a specification, reference being had to the annexed drawing, which is a side elevation of a simple form of apparatus for carrying out our invention.

The object of our invention is to provide a simple, cheap and effective process for the production of ozone in large quantities; also to furnish a process which is especially adapted for working in connection with electric currents from electric light wires.

In carrying out our invention, we employ any electrolytic apparatus with separate but communicating chambers for the generation of hydrogen and ozone, and insert the positive and negative electrodes in the chambers, connecting them with an electric generator of suitable power, and we arrange connections for removing the hydrogen liberated from the negative electrode, while the ozone generated at the positive electrode escapes into the surrounding air, or it may, if desired, be conveyed away in a tube.

In producing ozone on a small scale, we may employ the ordinary apparatus like that shown in the drawing, which consists of the tubes A, B, connected by a cross tube C. The tube A has a wire $a$ sealed in the bottom thereof, which is connected with the electrode D contained in the tube, while the tube B has a wire $a'$ sealed in the lower end thereof, which is connected with the positive electrode D'. The upper end of the tube A is contracted to receive a flexible tube E for conveying away hydrogen. In the present case the mouth of the tube B is flared to facilitate the escape of ozone. In this electrolytic apparatus is placed a solution of permanganate of potassium in water acidulated, for better conductivity, with sulphuric acid. The wires $a$ $a'$ are connected with an electrical generator F, and ozone and oxygen are immediately evolved from the positive electrode D', in quantities varying with the size of the electrodes, their distance apart, the strength of the current and the strength of the electrolytic liquid.

We have found that the proportions of the permanganate of potassium and acid may be varied, and that the sulphuric acid may be replaced by nitric acid, hydrochloric acid, or a concentrated solution of chloride of sodium, without materially affecting the results, the main requisite to the production of large quantities of ozone being the presence of a permanganate such as permanganate of potassium. We have found that permanganate of sodium, permanganate of silver, permanganate of barium, and in fact any permanganate of a solid metallic base can be used; therefore we do not confine ourselves to permanganate of potassium. We have found that the best results are obtained by using saturated solutions of permanganate of potassium, and that the saturation may be maintained by the presence of crystals of permanganate of potassium in excess in a five or ten per cent. solution of sulphuric acid.

When a permanganate salt is used, such as permanganate of potash, the chemical action which takes place during eletrolysis, is the breaking up of a part of the water into hydrogen peroxide, and the subsequent decomposition of hydrogen peroxide, and formation of ozone in large quantity by one of the molecules of oxygen in the permanganate, thus:

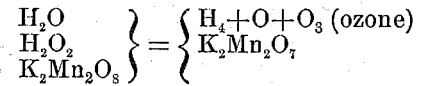

This process we find gives us as much as thirty-eight and five-tenths per cent. of ozone at the positive electrode.

In defining our invention with greater clearness, we would state that we are aware that it has been suggested that in the electrolysis of water the addition of permanganic acid is said to increase the proportion of ozone evolved. It is, however, such an unstable compound that it is impracticable to use it, and furthermore it tends rather to break up into the oxide of manganese, instead of changing the peroxide of hydrogen into ozone, and we therefore make no claim to the same, but confine our invention to a stable permanganate salt in this connection which not only may be practically used in a commercial way, but also gives a different chemical reaction, for the permanganate salt (potassium permanganate) undergoes no change, except to part with one equivalent of oxygen, which goes to the hydrogen peroxide, and, when this is broken up by electrolysis, forms ozone ($O_3$).

Having thus described our invention, what we claim as new, and desire to secure by Letters Patent, is—

1. The process of generating ozone which consists in submitting to electrolytic action a solution of a permanganate of a solid metallic base in water substantially as and for the purpose described.

2. The process of generating ozone which consists in submitting to electrolytic action a solution of potassium permanganate in water substantially as and for the purpose described.

JOHN T. DONOVAN,
HENRY L. GARDNER.

Witnesses:
HAROLD D. STEBBINS,
RALPH P. ALDEN.